(12) United States Patent
Gonda et al.

(10) Patent No.: US 11,505,257 B2
(45) Date of Patent: Nov. 22, 2022

(54) MOTOR VEHICLE HAVING CROSS-BRACES AND A GROUP OF CORRESPONDING MOTOR VEHICLES

(71) Applicant: BAYERISCHE MOTOREN WERKE AKTIENGESELLSCHAFT, Munich (DE)

(72) Inventors: Mihaly Gonda, Unterschleissheim (DE); Tatjana Schoierer, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 81 days.

(21) Appl. No.: 17/053,584

(22) PCT Filed: Jun. 18, 2019

(86) PCT No.: PCT/EP2019/065953
§ 371 (c)(1),
(2) Date: Nov. 6, 2020

(87) PCT Pub. No.: WO2020/011492
PCT Pub. Date: Jan. 16, 2020

(65) Prior Publication Data
US 2021/0229750 A1    Jul. 29, 2021

(30) Foreign Application Priority Data
Jul. 11, 2018    (DE) ...................... 10 2018 211 490.0

(51) Int. Cl.
B62D 25/08    (2006.01)
(52) U.S. Cl.
CPC .................................... *B62D 25/08* (2013.01)

(58) Field of Classification Search
CPC ....................................................... B62D 25/08
(Continued)

(56) References Cited

U.S. PATENT DOCUMENTS

| | | | |
|---|---|---|---|
| 5,829,824 A | 11/1998 | Yamamuro et al. | |
| 9,828,031 B2 * | 11/2017 | Langhoff | B62D 21/155 |
| 2017/0183037 A1 | 6/2017 | Kato et al. | |

FOREIGN PATENT DOCUMENTS

| | | |
|---|---|---|
| CN | 105313981 A | 2/2016 |
| DE | 10 2010 039 109 A1 | 2/2012 |

(Continued)

OTHER PUBLICATIONS

International Search Report (PCT/ISA/210) issued in PCT Application No. PCT/EP2019/065953 dated Sep. 9, 2019 with English translation (five (5) pages).

(Continued)

*Primary Examiner* — D Glenn Dayoan
*Assistant Examiner* — Dana D Ivey
(74) *Attorney, Agent, or Firm* — Crowell & Moring LLP

(57) ABSTRACT

For improving the driving dynamics of a motor vehicle with two rear longitudinal members which are spaced apart from one another and which each have a rear axle bushing for receiving a rear axle and are connected to one another by a cross-member which is at the rear in the main travel direction of the motor vehicle, the rear cross-member has in the plane of its extent an offset in the direction of the rear of the vehicle. When considered in the vertical direction of the motor vehicle, an upper cross-member is located above the rear cross-member, wherein the upper cross-member is attached to the rear longitudinal members in the region of the respective rear axle bushings.

6 Claims, 3 Drawing Sheets

(58) Field of Classification Search
USPC .................................................. 296/203.04
See application file for complete search history.

(56) References Cited

FOREIGN PATENT DOCUMENTS

| DE | 10 2016 224 732 A1 | 6/2018 | |
|----|--------------------|--------|---|
| WO | WO 2018/124973 A1 | 7/2018 | |
| WO | WO-2018124973 A1 * | 7/2018 | ........... B62D 25/087 |

OTHER PUBLICATIONS

German-language Written Opinion (PCT/ISA/237) issued in PCT Application No. PCT/EP2019/065953 dated Sep. 9, 2019 (six (6) pages).

German-language Search Report issued in German Application No. 10 2018 211 490.0 dated Mar. 11, 2019 with partial English translation (12 pages).

English-language Chinese Office Action issued in Chinese application No. 201980028547.3 dated Apr. 6, 2022 (Five (5) pages).

\* cited by examiner

MOTOR VEHICLE HAVING CROSS-BRACES AND A GROUP OF CORRESPONDING MOTOR VEHICLES

BACKGROUND AND SUMMARY OF THE INVENTION

The present invention relates to a motor vehicle which has cross-braces, and to a group of motor vehicles, which group is configured by way of different motor vehicles of the abovementioned type.

DE 10 2010 039 109 A1 has disclosed a motor vehicle with two rear longitudinal carriers which in each case have an axle bush for receiving a rear axle. The two rear longitudinal carriers are connected to one another by means of two cross-members which are spaced apart from one another as viewed in the vehicle longitudinal direction.

It is an object of the present invention to provide a motor vehicle, the installation space of which between the rear longitudinal carriers is increased with respect to the prior art, without the rigidity of the motor vehicle body being compromised.

This object is achieved by way of a motor vehicle according to the independent claim. Advantageous refinements are specified in the dependent claims.

A motor vehicle according to the invention has two rear longitudinal carriers which are spaced apart from one another, in each case have a rear axle bush for receiving a rear axle, and are connected to one another by means of a rear cross-member as viewed in the main traveling direction of the motor vehicle. The motor vehicle is distinguished by the fact that, in its plane of extent, the rear cross-member has an offset in the direction of the vehicle rear, and that an upper cross-member is situated above the rear cross-member, as viewed in the vertical direction of the motor vehicle, the upper cross-member being fastened to the rear longitudinal carriers in the region of the respective rear axle bushes.

By way of this arrangement, a motor vehicle is advantageously provided which firstly provides an increased installation space in comparison with the prior art for the accommodation, in particular, of a rear axle carrier or another, in particular electrified, drive unit, and secondly complies with the requirements of a high rigidity of the motor vehicle body. Here, in particular, the invention is based on the finding that the arrangement of the upper cross-member in the region of the respective rear axle bushes makes a disproportionate contribution to an envisaged vehicle body rigidity.

It is to be noted that the term "in the region" must not be interpreted too narrowly, and allows certain tolerances. In a particularly advantageous way, however, the center lines of the rear axle bushes, the rear cross-member and the upper cross-member are situated on a common virtual axis in the transverse direction of the motor vehicle with regard to the vertical longitudinal plane of the motor vehicle (which vertical longitudinal plane is also called the zero Y plane in accordance with ISO 4130-1978).

The rigidity of the motor vehicle is increased further in an advantageous way if the rear cross-member is fastened in the region of the respective rear bushes.

For the purpose of a further increase of the installation space which has already been addressed above, it is provided in an advantageous way that the upper cross-member is arranged in an inclined manner with respect to the rear cross-member. It is provided in a particularly advantageous way that the upper (as viewed in the vehicle vertical direction) section of the rear cross-member is arranged in front of the lower section of the rear cross-member, as viewed in the main traveling direction of the motor vehicle.

It is provided in accordance with one preferred embodiment of the invention that the upper cross-member is configured as a folded metal sheet and/or the rear cross-member is configured as a hollow profile. As a result, a further improved combination of an increased rigidity of the motor vehicle and an enlarged installation space for the accommodation of a rear axle carrier or another, in particular electrified, drive unit are achieved in an advantageous way.

The overall rigidity of the motor vehicle according to the invention is increased further in an advantageous way if a further cross-member which is fastened to the rear longitudinal carriers is situated in front of or behind the rear cross-member and/or the upper cross-member, as viewed in the main traveling direction of the motor vehicle. The clear spacing between them configures a receiving space for the abovementioned drive unit.

A further object of the present invention consists in specifying a group of motor vehicles with different drives, the rigidity of the respective motor vehicles being substantially identical in a simple way despite the different drives.

This object is achieved by way of a group of motor vehicles. In the case of this group of motor vehicles, a first motor vehicle of the type disclosed above which has a first drive (in particular, a rear axle which is driven by means of an internal combustion engine), and at least one second motor vehicle of the type disclosed above which has a drive which is different than the first drive (in particular, a rear axle which is driven by means of an electric motor or a hybrid drive) are provided, the rear cross-member and the upper cross-member of the first motor vehicle and the rear cross-member and the upper cross-member of the second motor vehicle being set up in such a way that the vehicle body rigidity of the first motor vehicle corresponds substantially to the vehicle body rigidity of the second motor vehicle. In other words, it is possible in an advantageous way, by way of an expedient configuration of the rear cross-members and upper cross-members of the respective motor vehicles, for the rigidity of the respective vehicle bodies to be of substantially identical design despite different drives. As a result, motor vehicles of one motor vehicle range which are driven in different ways but have a substantially identical vehicle body rigidity and/or driving dynamics can be produced inexpensively in a way which is suitable for mass production.

There will be a detailed, non-prejudicial, in particular non-restrictive, description of exemplary embodiments of the present invention in the following text with reference to the appended figures, which are not to scale. In the description, identical elements are provided with identical designations.

DETAILED DESCRIPTION OF THE DRAWINGS

Figure 1:
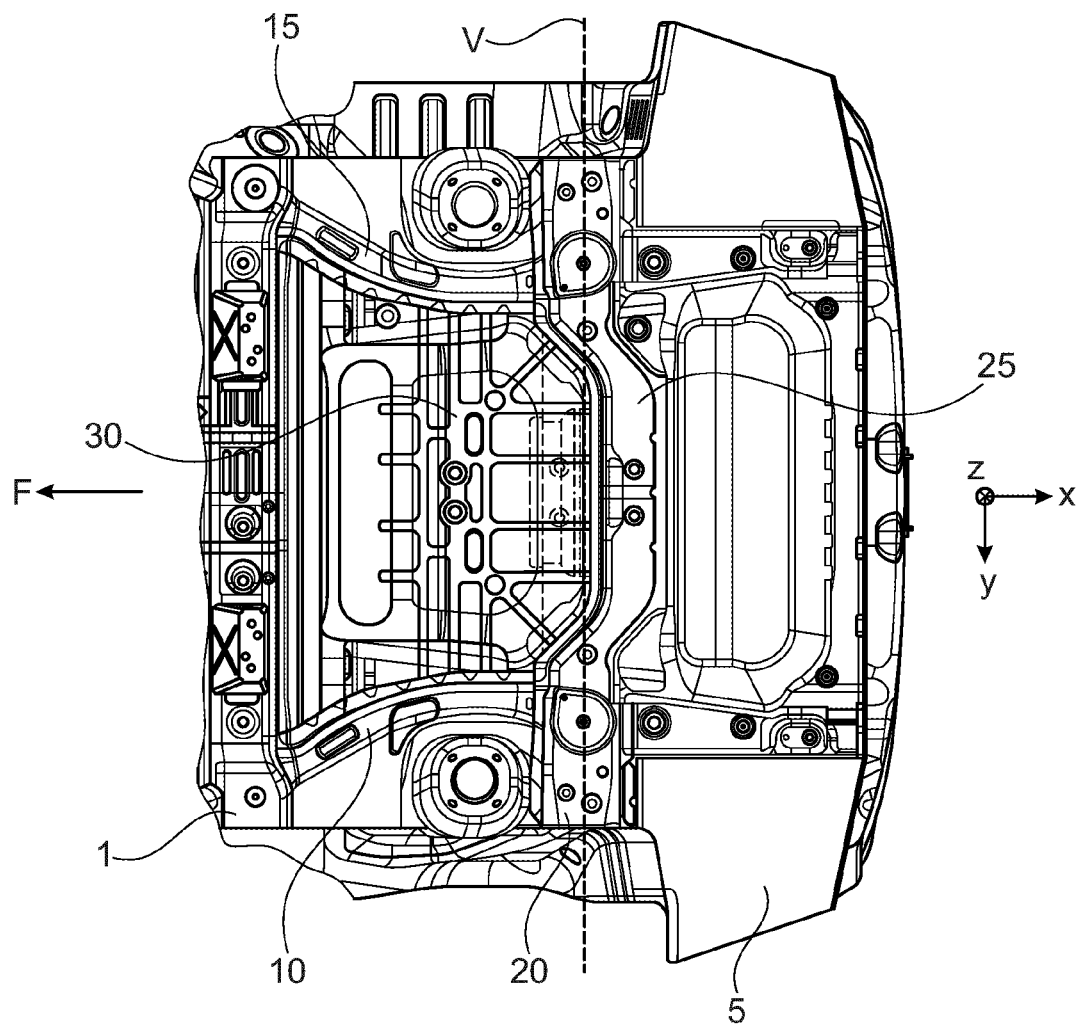
FIG. 1 shows a rear section of a vehicle body of a partially illustrated motor vehicle in a bottom view.

FIG. 1 partially shows a motor vehicle 1 in a bottom view. Specifically, a rear 5 of the motor vehicle 1 is shown, a left-hand rear longitudinal carrier 10 and a right-hand rear longitudinal carrier 15 being arranged on the left-hand and right-hand side, respectively, of the rear 5 in the main traveling direction F (that is to say the direction in which the motor vehicle 1 usually moves forward in the case of driving in a straight line). The two rear longitudinal carriers 10, 15 are connected to one another by means of a rear cross-member 20 which is situated at the rear 5 of the motor vehicle 1. The rear cross-member 20 has an offset 25 which is configured symmetrically with respect to the x-axis and substantially parallel to an x-y plane of a vehicle Cartesian coordinate system (known per se) in accordance with ISO 4130-1978, and is oriented from the front (not shown here) of the motor vehicle 1 toward its rear 5. A receiving space 30 for receiving a part (not shown here but known per se) of a drive, for example of an electrified drive or a rear drive, is provided in that section of the motor vehicle 1 which lies in front of the offset 25 as viewed in the main traveling direction F and between the two rear longitudinal carriers 10, 15, which receiving space 30 is enlarged in comparison with receiving spaces which are known from the prior art and are likewise not shown here.

The rear cross-member 20 extends in a virtual axis V which is parallel to the y-axis. Above the rear cross-member 20 as viewed in the vehicle vertical direction (z-direction), an upper cross-member 35 which likewise extends in the direction of the virtual axis V is fastened, which upper cross-member 35 can be seen only partially for reasons of the view which is selected in FIG. 1. The upper cross-member 35 is fastened in the region of rear axle bushes 37 which are known per se (cf. FIG. 2) in order to receive a rear axle (not shown here).

Figure 2:
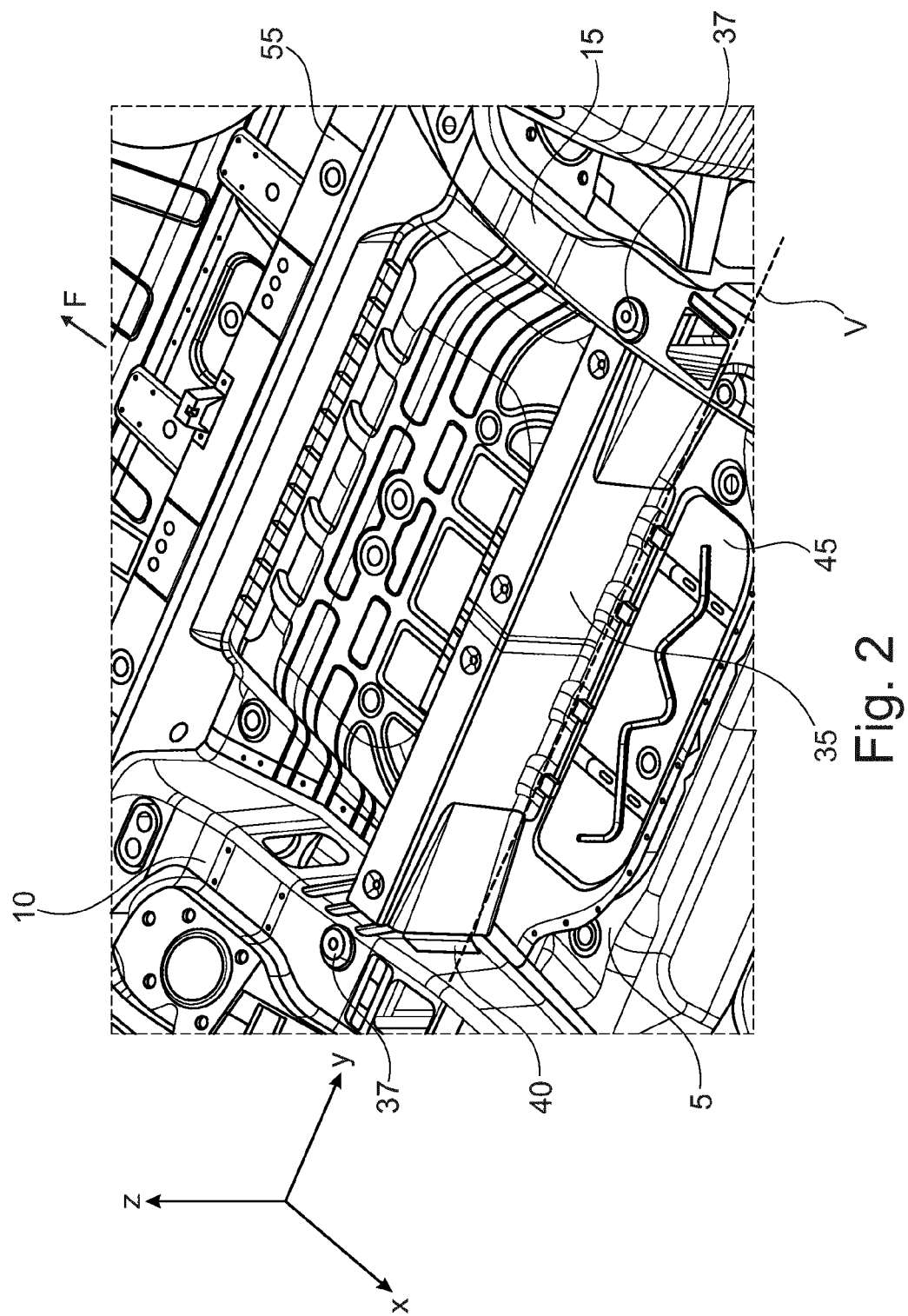
FIG. 2 shows a perspective plan view of an upper cross-member which is shown in the motor vehicle of FIG. 1.

In order to identify the upper cross-member 35 and in an improved manner, it is shown in a perspective plan view in FIG. 2. As can be seen, the upper cross-member 35 consists substantially of a box-shaped, folded hollow profile which is fastened at the end to those sides of the two rear longitudinal carriers 10, 15 which lie opposite one another by way of flanges 40 which are known per se (and of which only one is depicted for reasons of the perspective which is selected here).

Figure 3:
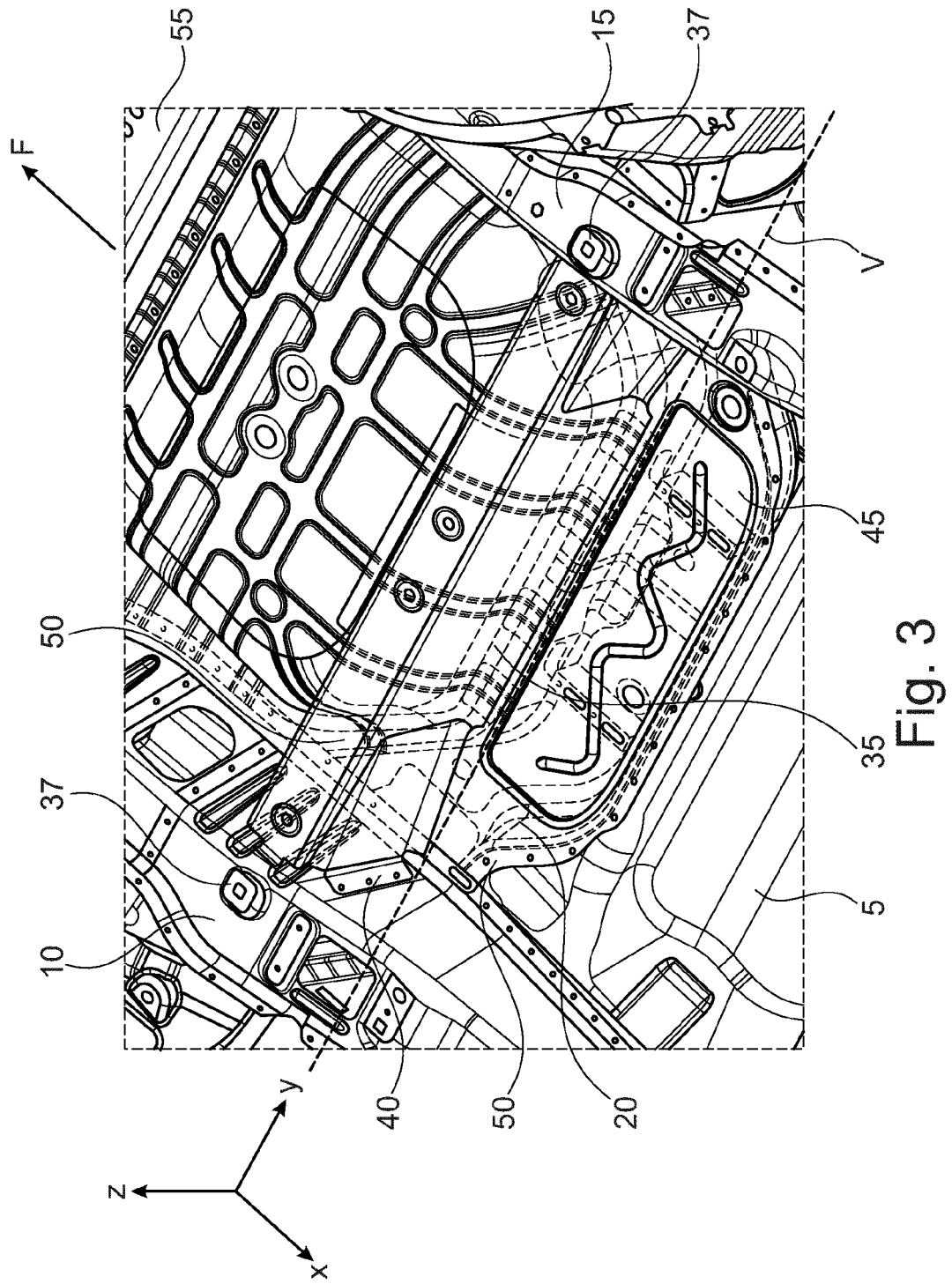
FIG. 3 illustrates a lower cross-member in the perspective which is known from FIG. 2.

For the purpose of improved clarity of the relative arrangement of the rear cross-member 20 and the upper cross-member 35 on the motor vehicle 1, the metal sheet 45, which is shown in FIG. 2 and is situated on the rear side next to the upper cross-member 35, and the upper cross-member are shown in a transparent manner in FIG. 3, whereas the perspective which is selected in FIG. 2 is retained in principle.

The rear cross-member 20 is fastened laterally to a bulkhead plate which is known per se on the left-hand and right-hand side of the motor vehicle 1. To this end, the rear cross-member 20 has in each case two supporting sections 50 which are spaced apart from one another on each side.

As can be gathered from FIGS. 2 and 3, a further cross-member 55 which is fastened to the rear longitudinal carriers 10, 15 is provided for further reinforcement of the motor vehicle 1, which cross-member 55 is situated in front of the rear cross-member 20 and the upper cross-member 35 as viewed in the main traveling direction F. The receiving space 30 is configured between them.

It is to be noted that the rear cross-member 20 and the upper cross-member 35 can consist of any suitable material, in particular of a steel alloy, an aluminum alloy or a fiber composite material. Fastening of the rear cross-member 20 and the upper cross-member 35 takes place, in particular, in a manner which is suitable for the material and production. It is thus possible, for example, for the rear cross-member 20 and the upper cross-member 35 to be fastened by means of spot welding to the left-hand rear longitudinal carrier 10 and right-hand rear longitudinal carrier 15 if the latter are configured from metal.

LIST OF DESIGNATIONS

1 Motor vehicle
5 Rear
10 Left-hand rear longitudinal carrier
15 Right-hand rear longitudinal carrier
20 Rear cross-member
25 Offset
30 Receiving space
35 Upper cross-member
37 Axle bushes
40 Flange
45 Metal sheet
50 Supporting sections
55 Further cross-member
F Main traveling direction
V Virtual axis
x,y,z Cartesian coordinate system in accordance with ISO 4130-1978

What is claimed is:

1. A motor vehicle, comprising:
   two rear longitudinal carriers which are spaced apart from one another and which each have a rear axle bush for receiving a rear axle;
   a rear cross-member, viewed in a main travel direction of the motor vehicle, connecting the two real longitudinal carriers, wherein
   the rear cross-member has in the plane of its extent an offset in the direction of the vehicle rear,
   an upper cross-member is situated above the rear cross-member, as viewed in the vertical direction of the motor vehicle, and
   the upper cross-member is fastened by flanges to the rear longitudinal carriers in the region of the respective rear axle bushes.

2. The motor vehicle according to claim 1, wherein
   the rear cross-member is fastened in the region of the respective rear axle bushes to a bulkhead plate of the motor vehicle.

3. The motor vehicle according to claim 1, wherein
   the upper cross-member is arranged in an inclined manner with respect to the rear cross-member.

4. The motor vehicle according to claim 1, wherein
   the upper cross-member is configured as a folded metal sheet and/or the rear cross member is configured as a hollow profile.

5. The motor vehicle according to claim 1, further comprising:
   a further cross-member situated in front of or behind the rear cross-member and/or the upper cross-member, as viewed in the main traveling direction of the motor vehicle.

6. A group of motor vehicles, comprising:
   a first and a second motor vehicle according to claim 1, the first motor vehicle having a first drive and the second motor vehicle having a second drive which is different than the first drive, wherein
   the rear cross-member and the upper cross-member of the first motor vehicle and the rear cross-member and the upper cross-member of the second motor vehicle are configured such that a vehicle body rigidity of the first motor vehicle corresponds to the vehicle body rigidity of the second motor vehicle.

\* \* \* \* \*